United States Patent
Suzuki

(10) Patent No.: US 11,537,346 B2
(45) Date of Patent: Dec. 27, 2022

(54) SERVER SYSTEM, METHOD, AND IMAGE FORMING APPARATUS FOR DISPLAYING JOB IDENTIFIERS

(71) Applicant: CANON KABUSHIKI KAISHA, Tokyo (JP)

(72) Inventor: Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/950,483

(22) Filed: Nov. 17, 2020

(65) Prior Publication Data

US 2021/0157539 A1    May 27, 2021

(30) Foreign Application Priority Data

Nov. 25, 2019   (JP) ............................. JP2019-212298

(51) Int. Cl.
    *G06F 3/12*    (2006.01)
(52) U.S. Cl.
    CPC .......... *G06F 3/1288* (2013.01); *G06F 3/1204* (2013.01); *G06F 3/1238* (2013.01)
(58) Field of Classification Search
    None
    See application file for complete search history.

(56) References Cited

U.S. PATENT DOCUMENTS

| 2012/0229851 A1* | 9/2012 | Nishida ................. G06F 3/1238 358/1.15 |
| 2013/0014112 A1 | 1/2013 | Nishida |
| 2015/0169266 A1* | 6/2015 | Iwasaki ................. G06F 3/1287 358/1.14 |

FOREIGN PATENT DOCUMENTS

JP            2012-133489 A       7/2012

* cited by examiner

*Primary Examiner* — Thomas D Lee
(74) *Attorney, Agent, or Firm* — Canon U.S.A., Inc. IP Division

(57) ABSTRACT

An image forming apparatus described in an exemplary embodiment of the present invention acquires a first token used to acquire information about print data that a user instructs the image forming apparatus to print while specifying a first server system from the first server system, acquires a second token used to acquire information about print data that the user instructs the image forming apparatus to print while specifying a second server system from the second server system, receives an instruction to display information about print data stored in an external server system from the user, and acquires information about first print data stored in the first server system using the first token and also acquires information about second print data stored in the second server system using the second token according to the instruction.

27 Claims, 16 Drawing Sheets

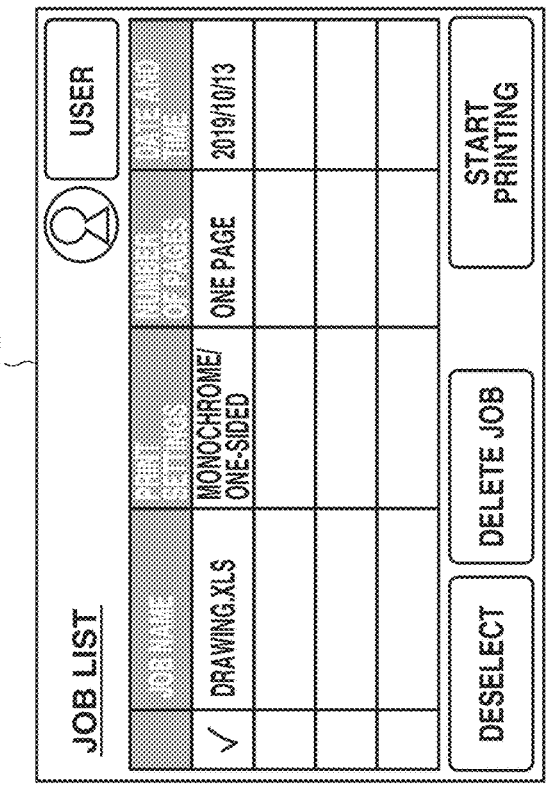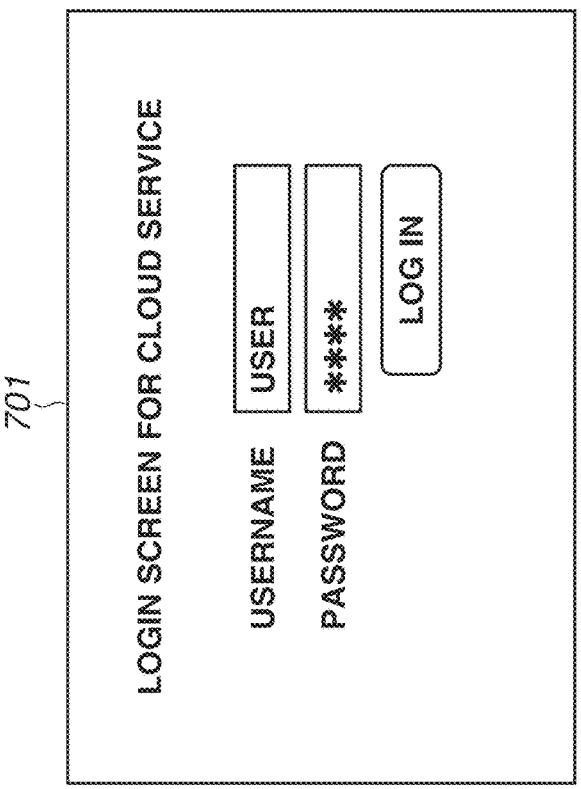
FIG.7A

LOGIN SCREEN FOR GENERAL-PURPOSE CLOUD PRINT SERVICE

USERNAME | USER
PASSWORD | ****

LOG IN

704

JOB LIST | | | | | USER

| | | | | | |
|---|---|---|---|---|---|
| ✓ | REPORT.PDF | COLOR/TWO-SIDED | | 7 PAGES | 2019/10/12 |
| | APPLICATION.DOC | MONOCHROME/ONE-SIDED | | 3 PAGES | 2019/10/14 |
| | | | | | |
| | | | | | |

DESELECT | DELETE JOB | START PRINTING

LOGIN SCREEN FOR EXTENDED
CLOUD PRINT SERVICE

USERNAME [USER]

PASSWORD [****]

[LOG IN]

706

JOB LIST  👤 USER

| | | | | |
|---|---|---|---|---|
| ✓ | CONTRACT.PDF | COLOR/ONE-SIDED | TWO PAGES | 2019/10/15 |

[DESELECT] [DELETE JOB] [ADVANCED SETTINGS] [START PRINTING]

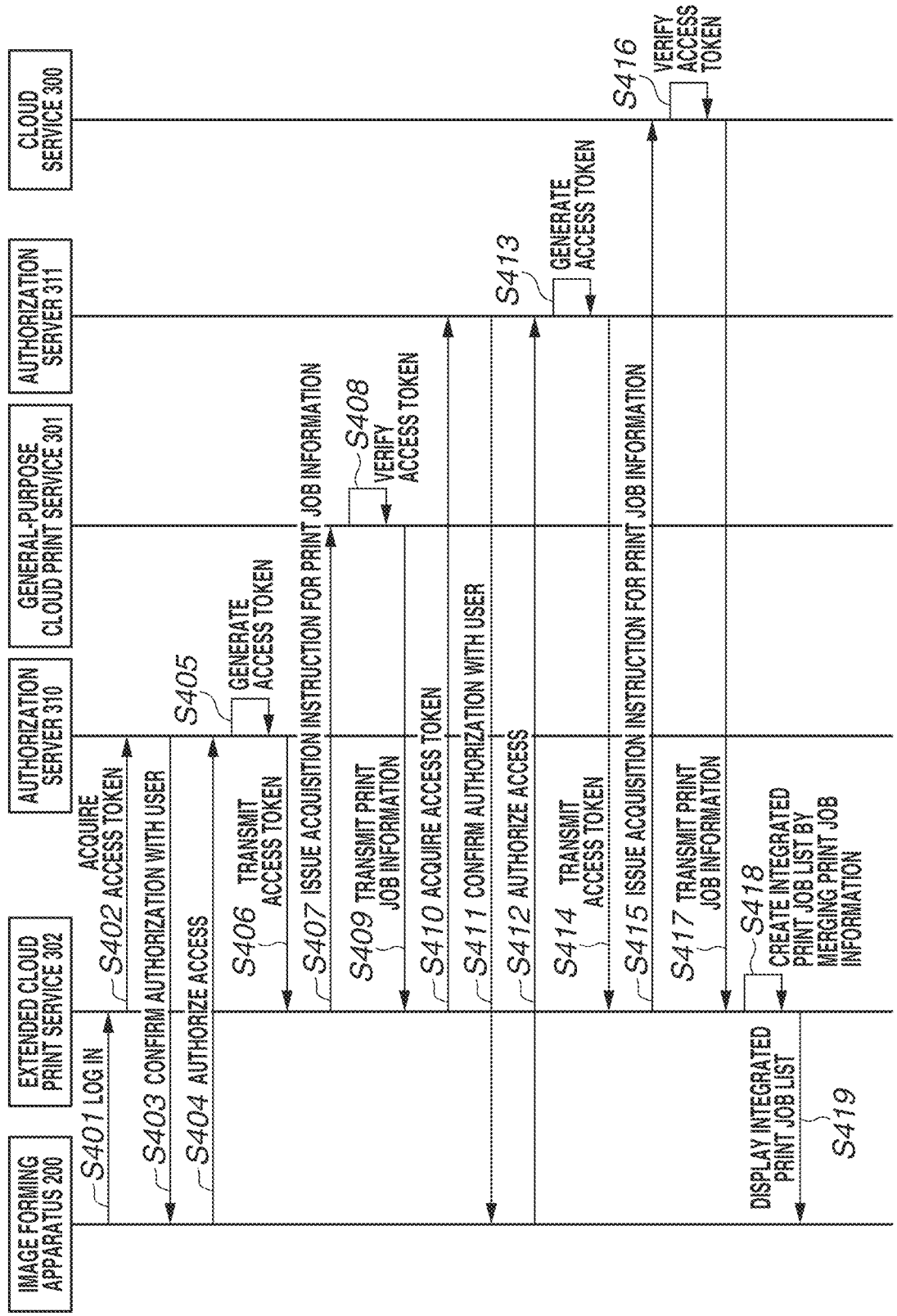

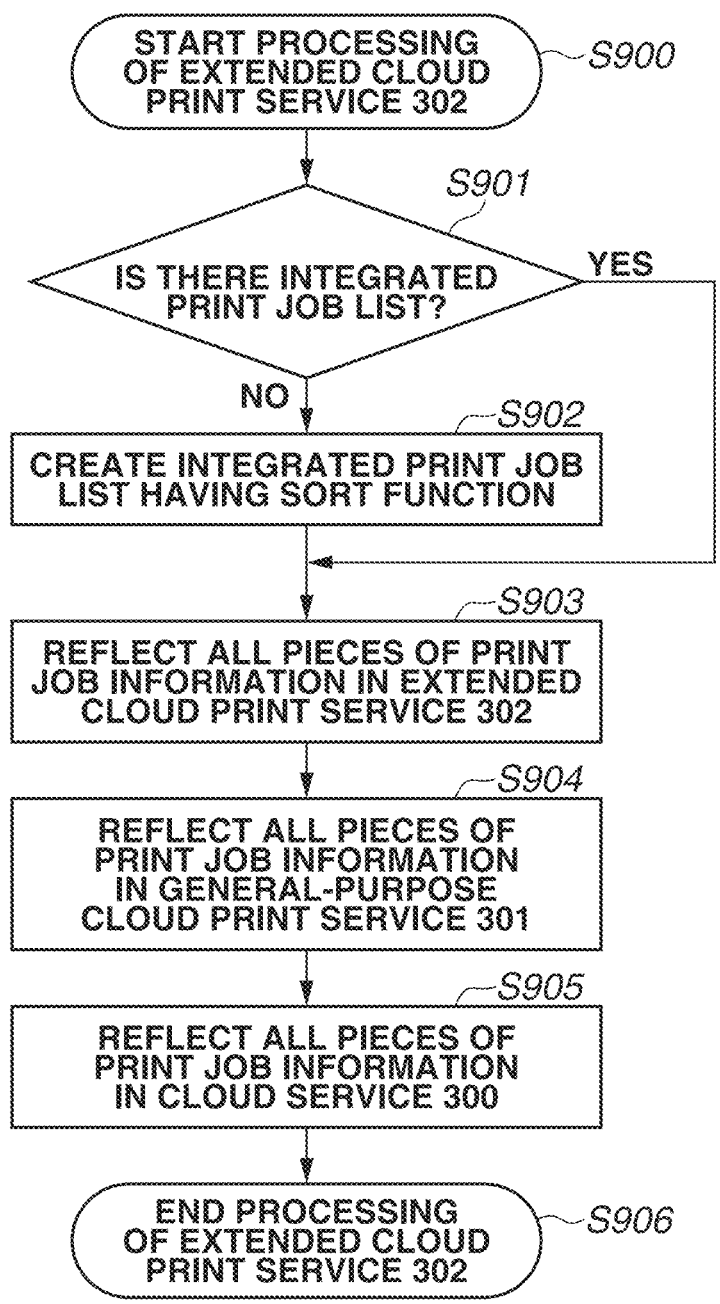

FIG.11

| JOB NAME ▼ | PRINT SETTINGS | CLOUD SERVICE ▼ | DATE AND TIME ▼ |
|---|---|---|---|
| ✓ REPORT.PDF | COLOR/ TWO-SIDED | GENERAL-PURPOSE CLOUD PRINT SERVICE | 2019/10/12 |
| DRAWING.XLS | MONOCHROME/ ONE-SIDED | CLOUD SERVICE | 2019/10/13 |
| APPLICATION.DOC | MONOCHROME/ ONE-SIDED | GENERAL-PURPOSE CLOUD PRINT SERVICE | 2019/10/14 |
| CONTRACT.PDF | COLOR/ ONE-SIDED | EXTENDED CLOUD PRINT SERVICE | 2019/10/15 |

JOB LIST — USER

DESELECT | DELETE JOB | ADVANCED SETTINGS | START PRINTING

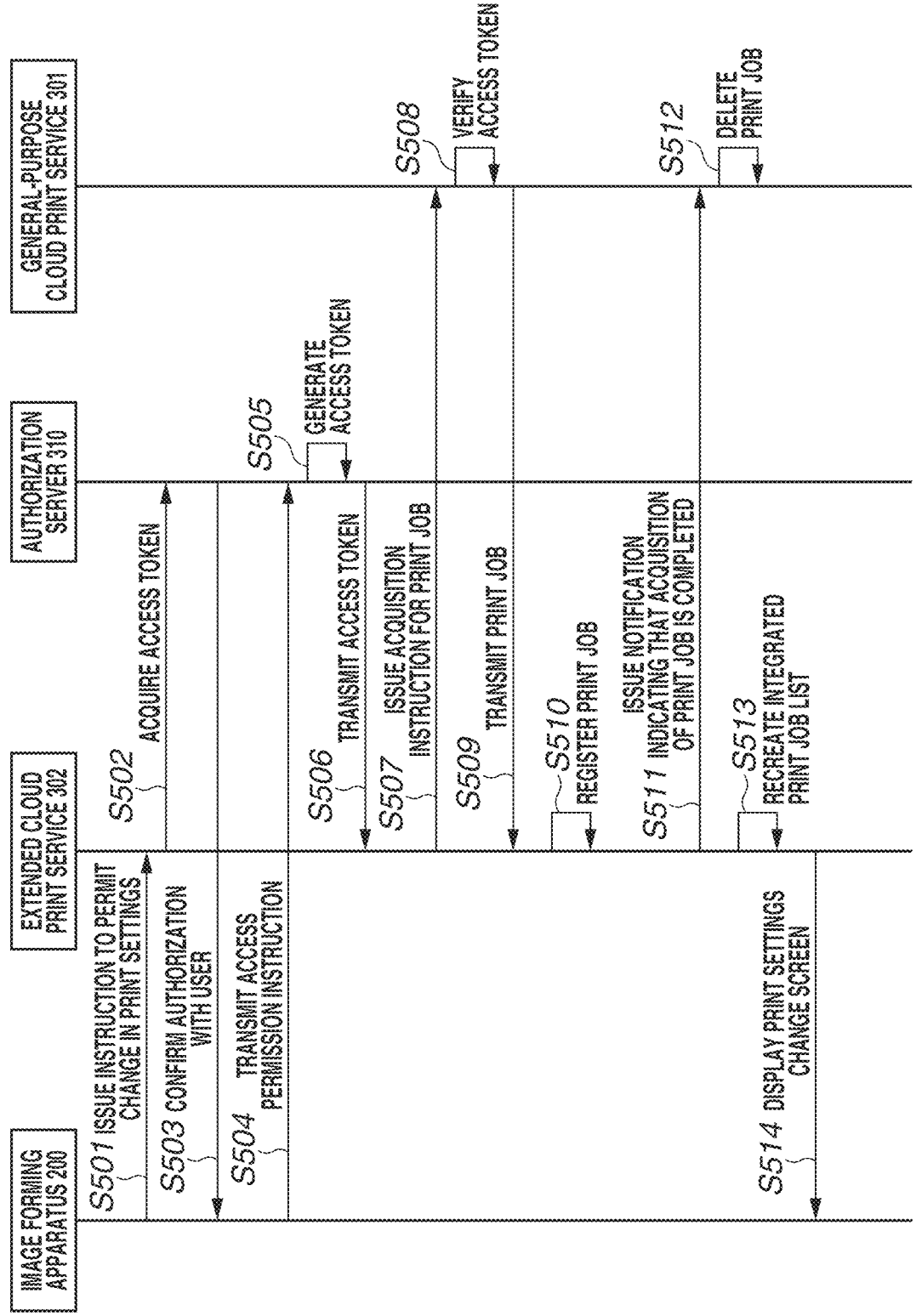

FIG.13

| | JOB NAME ▼ | PRINT SETTINGS | CLOUD SERVICE ▼ | DATE AND TIME ▼ |
|---|---|---|---|---|
| ✓ | REPORT.PDF | COLOR/ TWO-SIDED | EXTENDED CLOUD PRINT SERVICE | 2019/10/12 |
| | APPLICATION.DOC | MONOCHROME/ ONE-SIDED | EXTENDED CLOUD PRINT SERVICE | 2019/10/14 |
| ✓ | CONTRACT.PDF | COLOR/ ONE-SIDED | EXTENDED CLOUD PRINT SERVICE | 2019/10/15 |
| | DRAWING.XLS | MONOCHROME/ ONE-SIDED | CLOUD SERVICE | 2019/10/13 |

JOB LIST — USER

DESELECT | DELETE JOB | ADVANCED SETTINGS | START PRINTING

1301

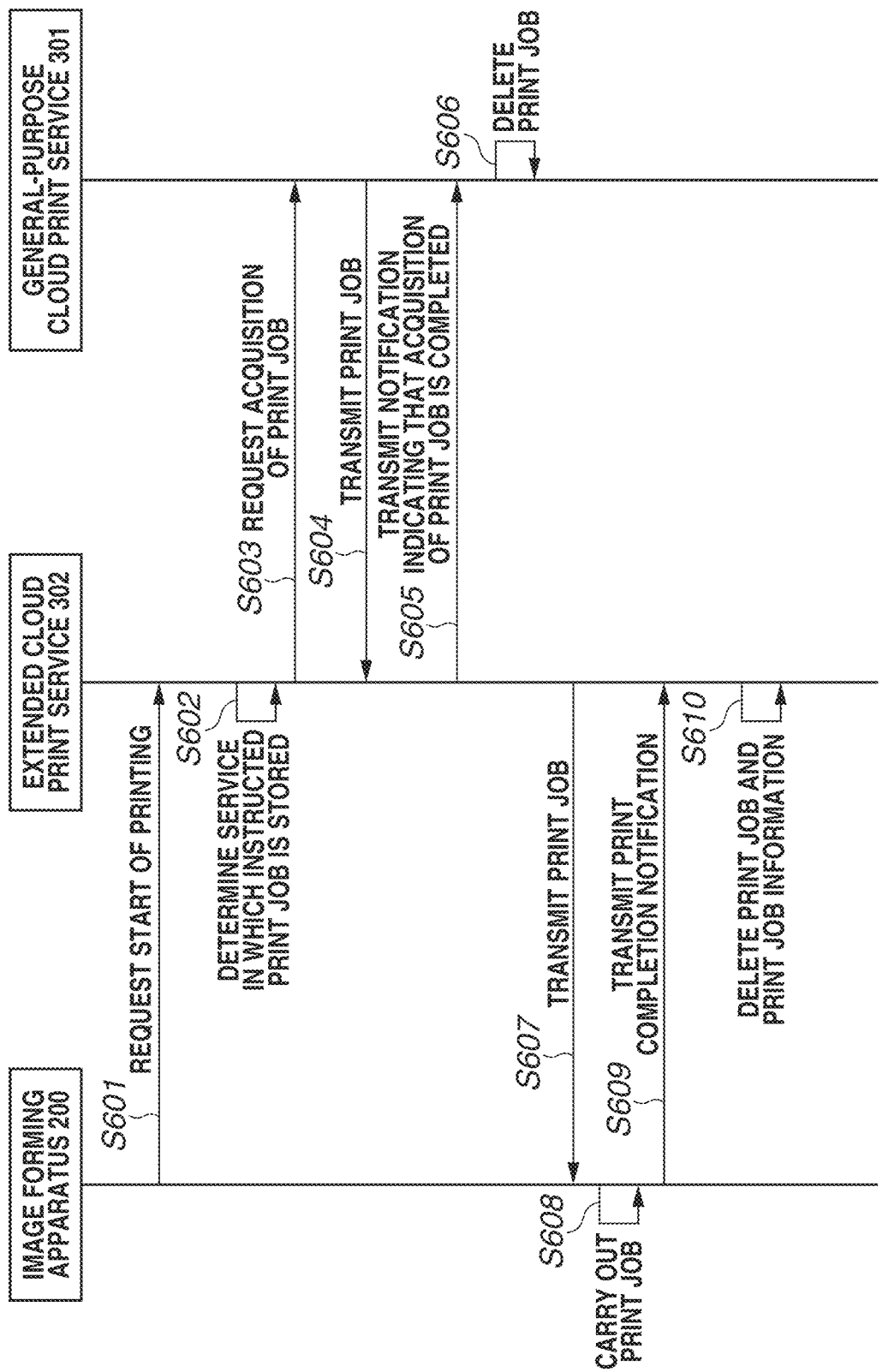

SERVER SYSTEM, METHOD, AND IMAGE FORMING APPARATUS FOR DISPLAYING JOB IDENTIFIERS

BACKGROUND OF THE INVENTION

Field of the Invention

The present invention relates to an image forming apparatus, a method for controlling an image forming apparatus, and a storage medium.

Description of the Related Art

It is known to transmit print data to an image forming apparatus via a cloud print service having a print function to print document data registered in a cloud service (Japanese Patent Application Laid-Open No. 2012-133489). In such a print system, first, an administrator registers the image forming apparatus in a tenant, which is a group on the cloud print service. The administrator sets whether to permit a user belonging to the tenant to use the image forming apparatus.

The user permitted to use the image forming apparatus based on the setting configured by the administrator submits a print job from a client terminal to the cloud print service. Then, the cloud print service stores and manages the received print job. Then, the image forming apparatus displays print jobs managed by the cloud print service, and acquires the print job selected by the user from the cloud print service and outputs it.

Representative examples of the cloud print service include, for example, Google Cloud Print®, Microsoft Hybrid Cloud Print®, and uniFLOW Online®.

One possible case is that a single user uses a plurality of cloud print services, and can submit a print job from any of the cloud print services. In such a case, if the user wants to select the print job to print on the image forming apparatus, the user needs to log in to the cloud print service used to print, and select the print job to print from among the print jobs registered in the cloud print service. Thus, if the user accidentally logs in to a cloud print service different from the cloud print service in which the print job that the user intends to print is registered, the user has to log in to the cloud print service again.

SUMMARY OF THE INVENTION

An image forming apparatus described in an exemplary embodiment of the present invention acquires a first token used to acquire information about first print data that a user instructs the image forming apparatus to print while specifying a first server system from the first server system, acquires a second token used to acquire information about second print data that the user instructs the image forming apparatus to print while specifying a second server system from the second server system, receives an instruction to display information about print data stored in an external server system from the user, and acquires information about first print data stored in the first server system using the first token and also acquires information about second print data stored in the second server system using the second token according to the instruction.

Further features of the present invention will become apparent from the following description of exemplary embodiments with reference to the attached drawings.

BRIEF DESCRIPTION OF THE DRAWINGS

FIG. 7A illustrates examples of a login screen and a print job list screen of the cloud service displayed on the image forming apparatus.

FIG. 7B illustrates examples of a login screen and a print job list screen of the general-purpose cloud print service displayed on the image forming apparatus.

FIG. 7C illustrates examples of a login screen and a print job list screen of the extended cloud print service displayed on the image forming apparatus.

FIG. 8 is a sequence diagram illustrating creation of a print job list on the extended cloud print service.

FIG. 9 is a flowchart illustrating creation of an integrated print job list on the extended cloud print service.

FIG. 11 illustrates an example of an integrated print job list screen displayed on the image forming apparatus.

FIG. 12 is a sequence diagram illustrating print job registration that allows print settings to be changed on the extended cloud print service.

FIG. 13 illustrates an example of an integrated print job list screen that allows advanced settings to be changed, which is displayed on the image forming apparatus.

FIG. 14 is a sequence diagram illustrating processing when the print job submitted to the general-purpose cloud print service is carried out on the image forming apparatus.

DESCRIPTION OF THE EMBODIMENTS

Figure 1:
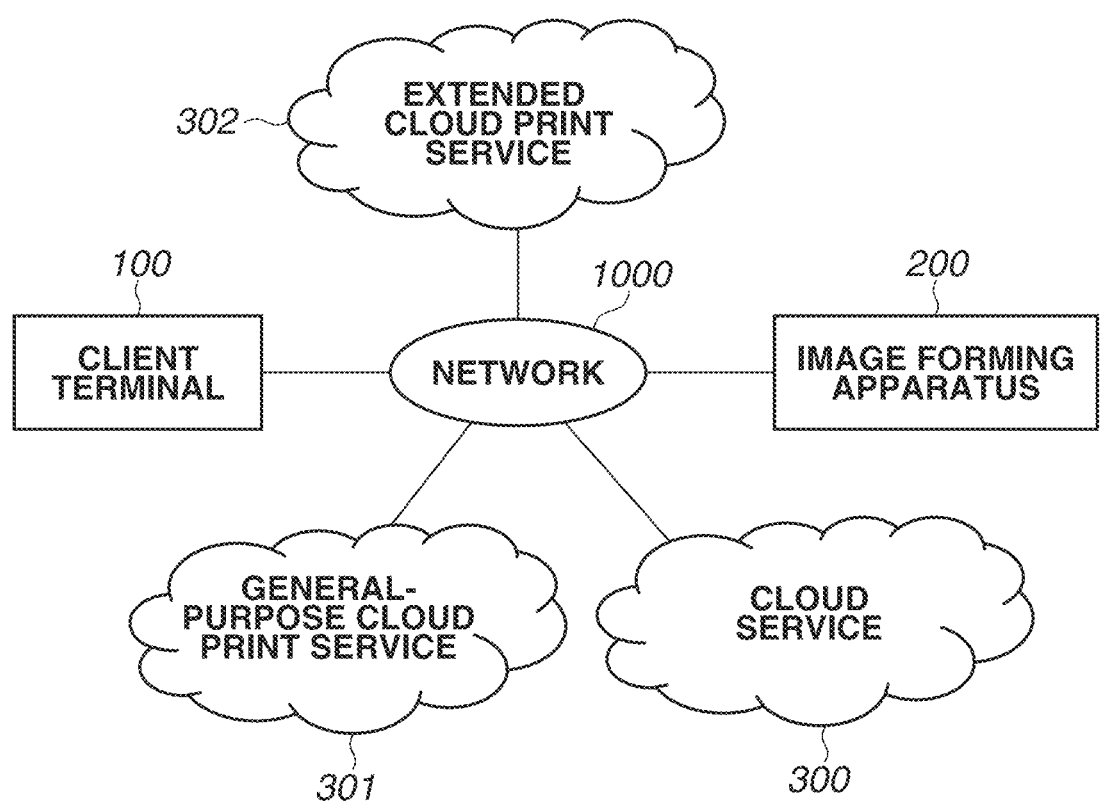
FIG. 1 schematically illustrates a cloud print system.

An example of a system configuration according to an exemplary embodiment of the present invention will be described with reference to FIG. 1. A system according to the present exemplary embodiment includes a client terminal 100, an image forming apparatus 200, a cloud service 300, a general-purpose cloud print service 301, and an extended cloud print service 302. The client terminal 100, the image forming apparatus 200, the cloud service 300, the general-purpose cloud print service 301, and the extended cloud print service 302 are connected to one another via a network 1000.

The client terminal 100 is a mobile terminal, such as a personal computer (PC), a mobile phone, a personal digital assistant (PDA), a multi-functional mobile phone (hereinafter referred to as a smart-phone), and a tablet held by a user.

The image forming apparatus 200 is a multi-functional peripheral having various functions such as scan, fax, print, and copy functions, or a printer having only the print function.

The cloud service 300 is a cloud service that allows, for example, document data to be generated, and a document to be shared and edited in collaboration among a plurality of users. Besides that, the cloud service 300 may be a cloud service used by the plurality of users to communicate with each other. The cloud service 300 has a function of being remotely accessed from the client terminal 100 and storing data into an online storage, and has a function of allowing the data to be printed by collaborating with each of cloud print services, which will be described below.

The general-purpose cloud print service 301 has a function of managing received data as a print job. Print data contains print settings in addition to image data required for printing. However, the print settings that can be specified on the cloud print service 301 are limited to basic settings such as N-on-1 printing, specifying a print page range, the two-sided layout, and specifying the number of copies.

The extended cloud print service 302 includes a cloud print service that allows the user to specify advanced settings in which the device characteristic of the image forming apparatus 200 is reflected. For example, a finishing setting corresponding to a finisher connected to the image forming apparatus 200, a profile setting to which an installed color profile is applied, and a setting of font substitution based on an installed font can be specified as print functions of the advanced settings.

In an example of a print flow according to the present exemplary embodiment, the user remotely accesses the cloud service 300 from the client terminal 100 and uses various kinds of cloud services such as a document generation service and a communication service. In a case where the user prints document data generated or shared online using the cloud service 300, the user selects either the basic function printing of the general-purpose cloud print service 301 or the advanced setting printing of the extended cloud print service 302 to print the document data. At this time, the user should have account information corresponding to each cloud print service, and is asked to input the account information at the time of printing. After the account information is input and basic function settings or the advanced settings are configured, the print job is transmitted to the image forming apparatus 200 and is output.

Next, a hardware configuration of the client terminal 100 illustrated in FIG. 1 will be described with reference to FIG. 2. It is apparent that the present invention can be applied to any of a single function, a system including a plurality of apparatuses, and a system in which processing is performed with a connection established via a network as long as the functions of the present invention can be fulfilled, unless otherwise noted specifically.

Figure 2:
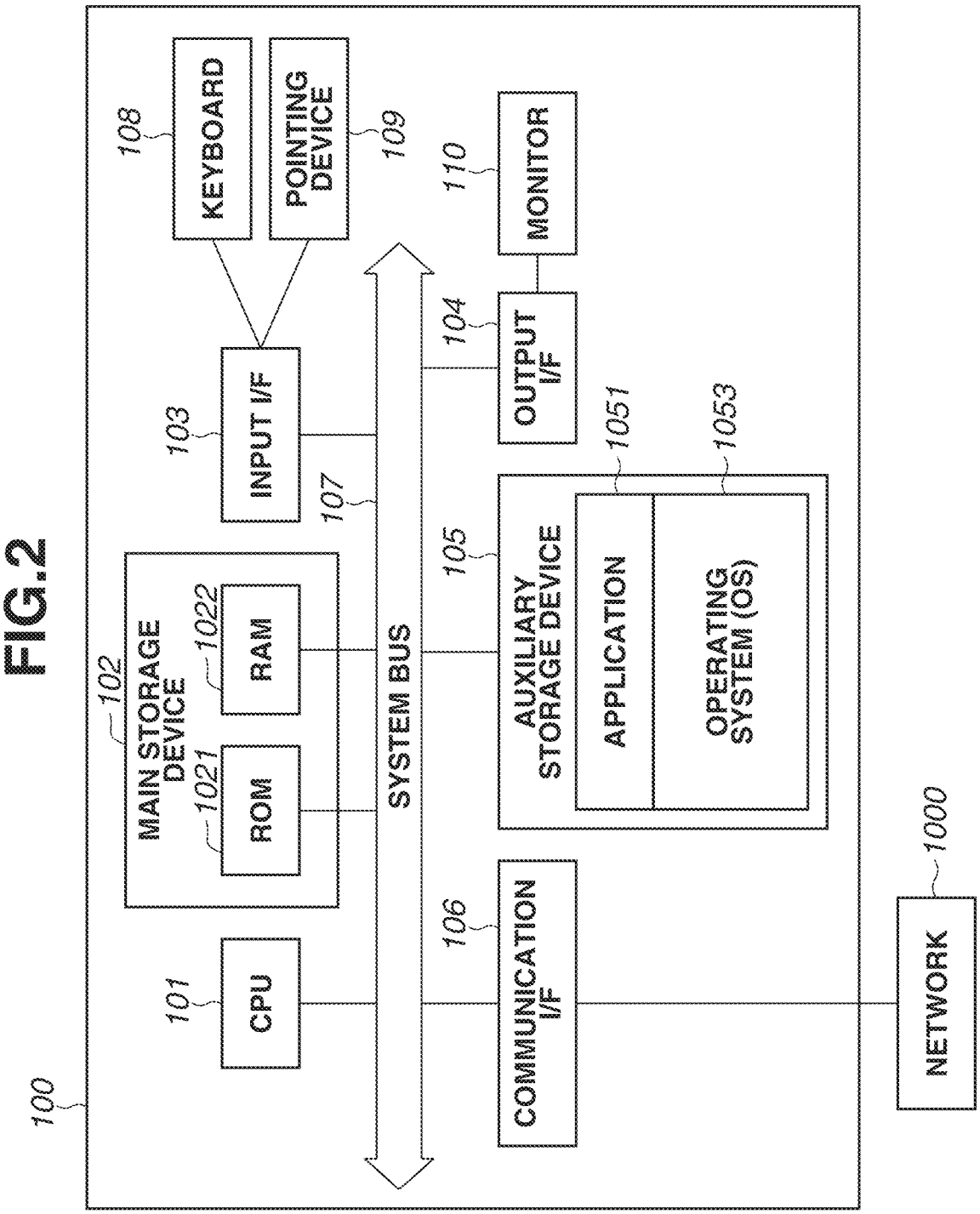
FIG. 2 illustrates an example of a hardware configuration of a client terminal.

FIG. 2 is a block diagram illustrating an example of the hardware configuration of a controller unit of the client terminal 100 illustrated in FIG. 1. A central processing unit (CPU) 101 controls the entire apparatus based on a program stored in a read only memory (ROM) 1021 or a random access memory (RAM) 1022 in a main storage device 102 or an auxiliary storage device 105.

The RAM 1022 is also used as a work area when the CPU 101 performs various kinds of processing. The auxiliary storage device 105 records an operating system (OS) 1053 and an application 1051 therein. In the following description, the main storage device 102 and the auxiliary storage device 105 will be collectively referred to as a storage device.

An input device such as a pointing device 109 represented by a mouse and a touch panel, and a keyboard 108 is a device connected via an input interface (I/F) 103 and used by the user to issue various kinds of instructions to the computer.

An output I/F 104 is an interface for outputting data to outside, and outputs the data to an output device such as a monitor 110.

A common data system bus 107 allows data to be exchanged between an I/F and a module. In addition, the CPU 101 performs processing based on the program stored in the storage device, whereby processing in steps illustrated in sequence diagrams that will be described below is implemented.

A communication I/F 106 is an interface used to connect the client terminal 100 to a network. The client terminal 100 is connected to the network 1000 via the communication I/F 106.

Figure 3:
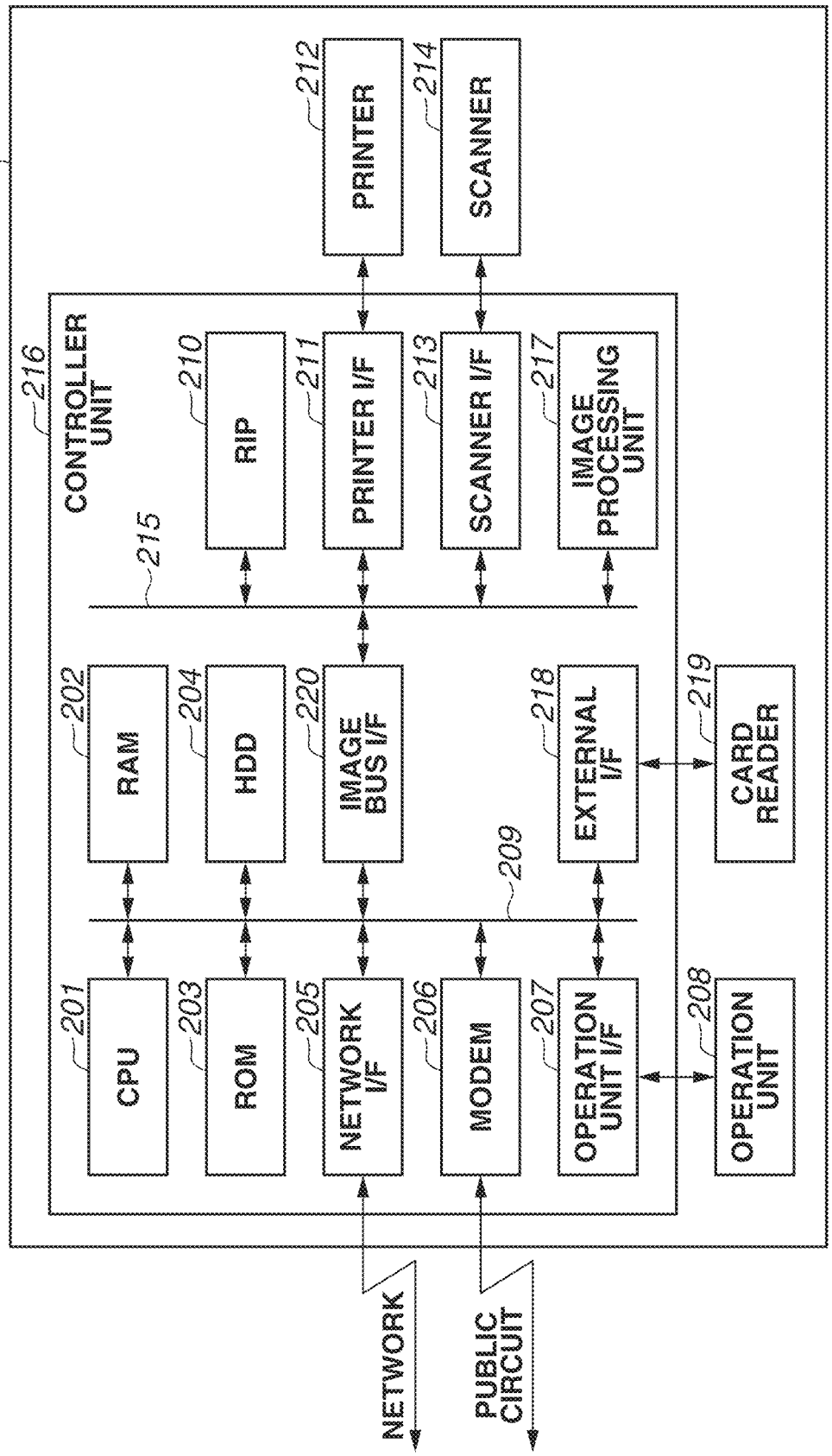
FIG. 3 illustrates an example of a hardware configuration of an image forming apparatus.

Next, the hardware configuration of the image forming apparatus 200 illustrated in FIG. 1 will be described with reference to FIG. 3. FIG. 3 is a block diagram illustrating an example of the hardware configuration of a controller unit of the image forming apparatus 200 illustrated in FIG. 1. A controller unit 216 is connected to a scanner 214, which functions as an image input device, and a printer 212, which functions as an image output device. Then, the controller unit 216 inputs and outputs image data and image forming apparatus information by connecting to the network 1000 or a public circuit such as a wide area network (WAN) (for example, the Public Switched Telephone Network (PSTN) or the Integrated Services Digital Network (ISDN)). In the controller unit 216, a CPU 201 is a processor that controls the entire system. A RAM 202 is a system work memory used to operate the CPU 201, and is also a program memory for recording a program and an image memory for temporarily recording image data. A ROM 203 stores a boot program of the system and various kinds of control programs therein. A hard disk drive (HDD) 204 stores various kinds of programs for controlling the system, image data, and the like therein. An operation unit I/F 207 is an interface unit with an operation unit (user interface (UI)) 208, and outputs image data to be displayed on the operation unit 208 to the operation unit 208. The operation unit I/F 207 plays a role of transmitting information (for example, the account information) input via the operation unit 208 by the user of the present system to the CPU 201. The operation unit 208 includes a display unit having a touch panel, and the user can issue various kinds of instructions by pressing a button displayed on the display unit (touching it with his/her finger or the like). A network I/F 205 connects to a network and inputs and outputs data. A modem 206 connects to the public circuit and is in charge of an input and output of data such as facsimile (FAX) transmission and reception. An external I/F 218 is an I/F unit that receives an external input, such as a Universal Serial Bus (USB) port, an Institute of Electrical and Electronics Engineers (IEEE) 1394 port, and a printer port. A card reader 219 for a readout from an integrated circuit (IC) card, which is required for authentication in the present exemplary embodiment, is connected to the external I/F 218. Then, the CPU 201 can control the readout of information from the IC card by the card reader 219 via the external I/F 218 and acquire the information read out from the IC card. The image forming apparatus configured in this manner is disposed on a system bus 209. An image bus I/F 220 is a bus bridge that connects between the system bus 209 and an image bus 215, which transfers image data at a high speed, and converts a data structure. The image bus 215 is constructed using a Peripheral Component Interconnect (PCI) bus or IEEE 1394 bus. The following hardware modules are disposed on the image bus 215. A raster image processor (RIP) 210 rasterizes vector data such as a page description language (PDL) code into a bitmap image. A printer I/F 211 connects the printer 212 to the controller unit 216 and converts image data synchronously or asynchronously. A scanner OF 213 connects the scanner 214 to the controller unit 216, and converts image data synchronously or asynchronously. An image processing unit 217 corrects, processes, and/or edits input image data, and adds a correction by the printer and/or converts the resolution with respect to print output image data. In addition thereto, the image processing unit 217 rotates the image data and performs compression and decompression processing such as Joint Photographic Experts Group (JPEG) for multivalued image data, and Joint Bi-level Image Experts Group (JBIG), Modified Modified Read (MMR), and Modified Huffman (MH) for binary image data. The scanner 214 illuminates an image on a sheet set as an original and scans the image with a charge coupled device (CCD) line sensor, thereby converting the image into electric signals of raster image data. The original sheet is set on a tray of an original feeder. The user of the apparatus issues an instruction to start reading of the original via the operation unit 208, which causes the CPU 201 to issue an instruction to the scanner 214, and the feeder feeds one original sheet at a time and performs a reading operation of the image on the original sheet. The printer 212 is a portion that converts the raster image data into an image on a sheet. Examples of the print method include an electrophotographic method using a photosensitive drum or a photosensitive belt, and an inkjet method that directly prints the image onto the sheet by ejecting ink from a minute nozzle array, and the printer 212 may employ any of the methods. Actuation of the print operation is started in response to an instruction from the CPU 201. The printer 212 includes a plurality of sheet feeding stages so as to allow the user to select different sheet sizes or different sheet orientations, and includes sheet cassettes corresponding thereto. The operation unit 208 includes a liquid crystal display (LCD) display unit, and a touch panel sheet is attached on the LCD. The operation unit 208 displays an operation screen of the system thereon, and when a displayed key is pressed, notifies the CPU 201 of positional information thereof via the operation unit I/F 207. Further, the operation unit 208 includes, for example, a start key, a stop key, an identification (ID) key, and a reset key as various kinds of operation keys. The start key of the operation unit 208 is used, for example, when the operation of reading the image on the original sheet is started. At the central portion of the start key, light emitting diodes (LEDs) of two colors, green and red, are provided, and whether the start key is in a usable state is indicated by these colors. The stop key of the operation unit 208 functions to stop an ongoing operation. The ID key of the operation unit 208 is used when a user ID of the user is input. The reset key is used when the settings configured via the operation unit 208 are initialized. The card reader 219 reads out the information stored in the IC card (for example, Felicity Card (Felica)® of Sony Corporation) under the control of the CPU 201 and notifies the CPU 201 of the read information via the external I/F 218. As being configured in this manner, the image forming apparatus 200 has a function of transmitting the image data read using the scanner 214 to a local area network (LAN) and a function of transmitting print data received from the LAN to the printer 212 to print and output it.

Figure 4:
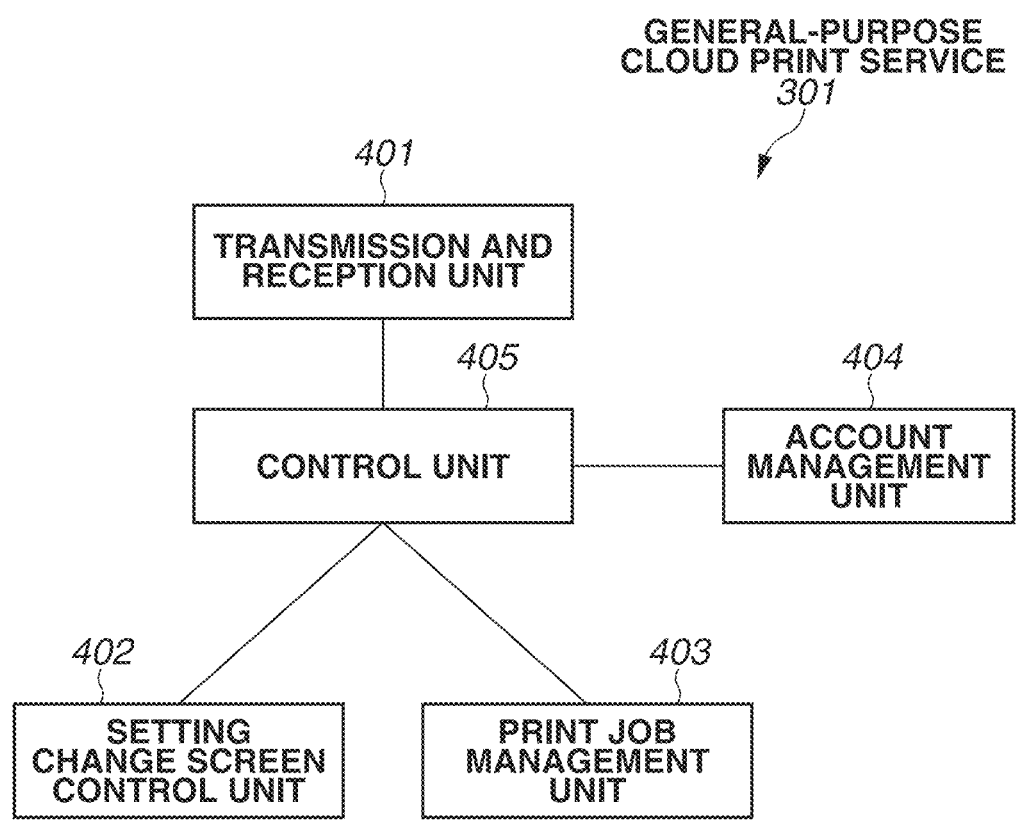
FIG. 4 illustrates an example of a software module configuration of a general-purpose cloud print service.

Next, a software configuration of the general-purpose cloud print service 301 illustrated in FIG. 1 will be described with reference to FIG. 4. FIG. 4 is a diagram illustrating the software module configuration of the general-purpose cloud print service 301 illustrated in FIG. 1. The general-purpose cloud print service 301 is a server system including one or a plurality of information processing apparatuses having a similar hardware configuration to the client apparatus illustrated in FIG. 2. The CPU(s) 101 of the one or plurality of information processing apparatuses execute(s) the program stored in the ROM 1021 or the auxiliary storage device 105 to implement the following software blocks.

A transmission and reception unit 401 transmits and receives the print job via a network to which the general-purpose cloud print service 301 is connected.

A setting change screen control unit 402 controls a screen on which the print settings are configured in a case where document data in the cloud service is printed. The print settings that can be specified on the print setting screen are limited to the basic settings such as N-on-1 printing, specifying a print page range, the two-sided layout, and specifying the number of copies.

A print job management unit 403 manages the print job in a case where the document data in the cloud service is printed. The print job management unit 403 manages the image forming apparatus 200 to which the print job can be submitted from the general-purpose cloud print service 301 based on a print queue. The print job management unit 403 generates the print job in reaction to a request to carry out the print job from the user, and manages the print job by placing it in the print queue. The print setting information set on the print setting screen of the setting change screen control unit 402 is also held and managed in the print queue. An external cloud print service can be specified as a destination to which the print job is submitted for the print queue with which the print job management unit 403 can register the print job. In other words, the extended cloud print service 302 can be specified as the submission destination.

In the present exemplary embodiment, the print job may be controlled using the print queue for which the extended cloud print service 302 is specified as the destination. Further, the print job management unit 403 has a function of creating a list of managed print jobs.

An account management unit 404 manages the account information of the user using the general-purpose cloud print service 301. The account information is necessary to use the general-purpose cloud print service 301, and a system administrator manages an output of the printing by managing the account information of the user.

A control unit 405 performs the overall control of various kinds of processing including the account management, the transmission and reception of the print data, the control of the screen for the print settings, the management of the print setting information, the generation of the print job, and the control of the print queue in the present exemplary embodiment.

The cloud service 300 includes a module for generating a document and a presentation material, a module for managing the generated document and presentation material in addition to the software modules included in the general-purpose cloud print service 301.

Figure 5:
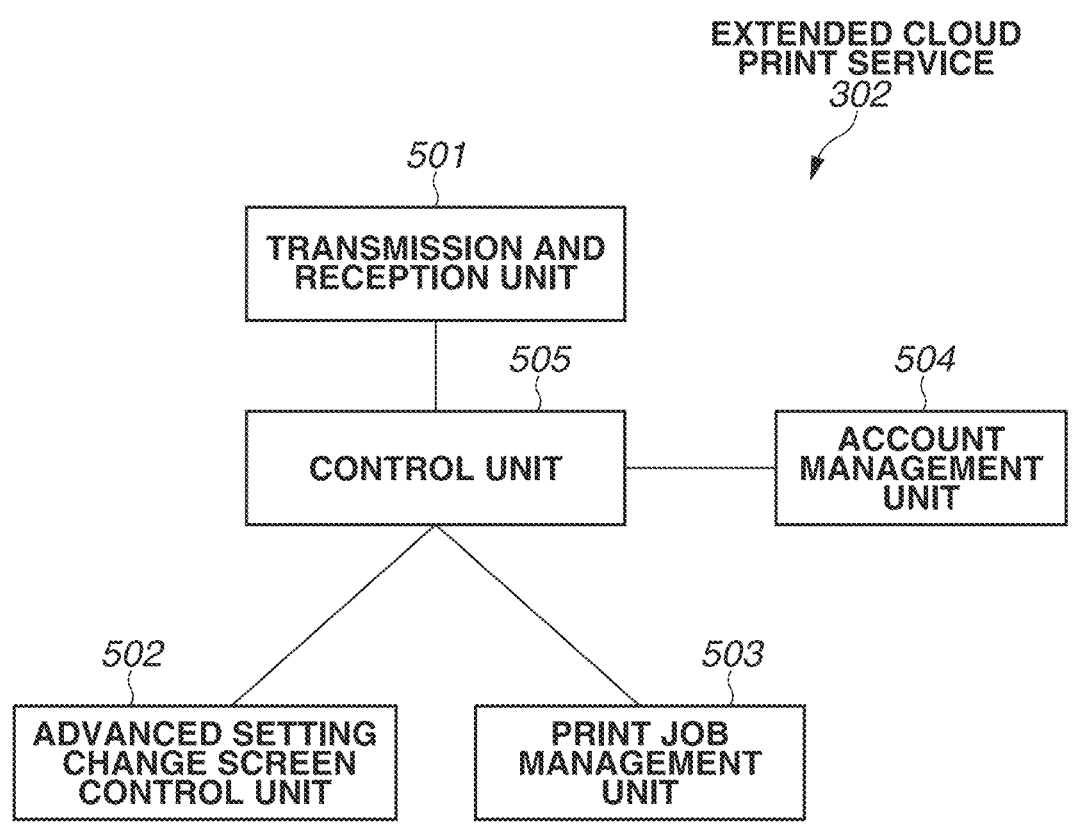
FIG. 5 illustrates an example of a software module configuration of an extended cloud print service.

Next, a software configuration of the extended cloud print service 302 illustrated in FIG. 1 will be described with reference to FIG. 5. FIG. 5 is a diagram illustrating the software module configuration of the extended cloud print service 302 illustrated in FIG. 1.

A transmission and reception unit 501 transmits and receives the print job via a network to which the extended cloud print service 302 is connected.

An advanced setting change screen control unit 502 controls a screen on which the print settings are configured in a case where document data in the cloud service is printed.

Settings such as the finishing setting corresponding to the finisher connected to the image forming apparatus 200, the profile setting to which the installed color profile is applied, and the setting of the font substitution based on the installed font are controlled as the print settings that can be set on the advanced setting change screen. The advanced setting change screen control unit 502 of the extended cloud print service 302 can set setting items that cannot be set on the print setting change screens displayed by the cloud service 300 and the general-purpose cloud print service 301. For example, the above-described finishing setting, color profile setting, font substitution setting, and the like are the setting items that cannot be set on the setting change screens but can be set on the advanced setting change screen.

A print job management unit 503 manages the print job in a case where the document data in the extended cloud print service 302 is printed. The print job management unit 503 manages the image forming apparatus 200 to which the print job can be submitted from the extended cloud print service 302 based on a print queue. The print job management unit 503 generates the print job in reaction to a request to carry out the print job from the user, and manages the print job by placing it in the print queue. The print setting information set on the print setting screen of the advanced setting change screen control unit 502 is also held and managed in the print queue.

An account management unit 504 manages the account information of the user using the extended cloud print service 302. The account information is necessary to use the extended cloud print service 302, and the system administrator manages an output of the printing by managing the account information of the user.

A control unit 505 performs the overall control of various kinds of processing including the account management, the transmission and reception of the print data, the control of the screen for the print settings, the management of the advanced print setting information, the generation of the print job, and the control of the print queue in the present exemplary embodiment.

Next, a method for registering the print job on the cloud service 300, the general-purpose cloud print service 301, and the extended cloud print service 302 will be described with reference to FIGS. 6A to 6C. The registration method will be described here referring to an example at the time of printing document data generated by the user using a document generation application in the cloud printing. The user issues an instruction to print a document on the document generation application. Next, the user selects a cloud service to use for the printing. At this time, the user selects one of the cloud service 300, the general-purpose cloud print service 301, and the extended cloud print service 302 and registers the intended printing as the print job.

Figure 6A:
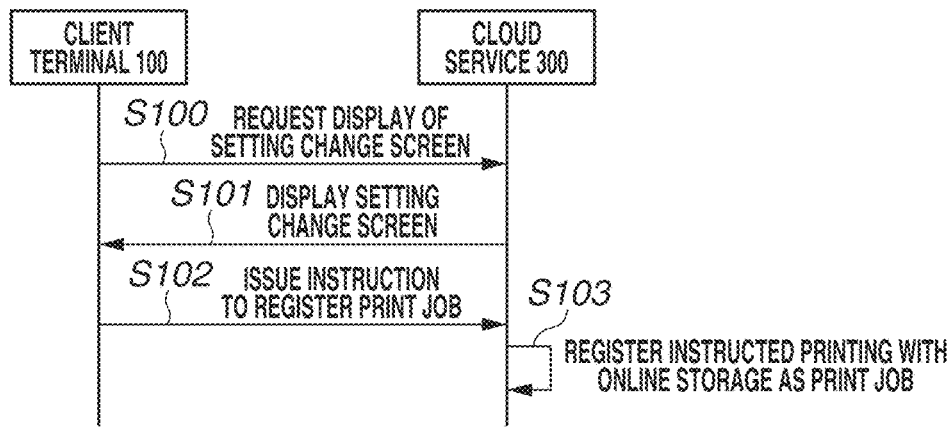
FIG. 6A is a sequence diagram illustrating print job registration on a cloud service.

FIG. 6A is a sequence diagram illustrating the method for registering the print job on the cloud service 300. In the present exemplary embodiment, the cloud service 300 has a function of generating document data or sharing document data and an online storage function of maintaining and managing the document data. The method for registering the document data as the print job will be described below.

In step S100, the client terminal 100 transmits a request to display the setting change screen to the cloud service 300.

In step S101, the cloud service 300 causes the client terminal 100 to display the setting change screen thereon. The user configures the print settings by operating the setting change screen. After that, the user selects an "execute printing" button to issue an instruction to execute the printing.

In step S102, the client terminal 100 transmits an instruction to register the print job to the cloud service 300.

In step S102, the client terminal 100 instructs the cloud service 300 to register the print job of the document data specified by the user.

In step S103, the cloud service 300 registers the instructed document data in the online storage held by the cloud service 300 as the print job in reaction to the instruction to register the print job.

Unlike the cloud print services that will be described below, the present processing is performed to indicate that the document data generated by the user is explicitly handled as the print job. In a case where all pieces of document data stored in the cloud service 300 are to be handled as the print jobs, the instruction to register the print job does not have to be issued.

Figure 6B:
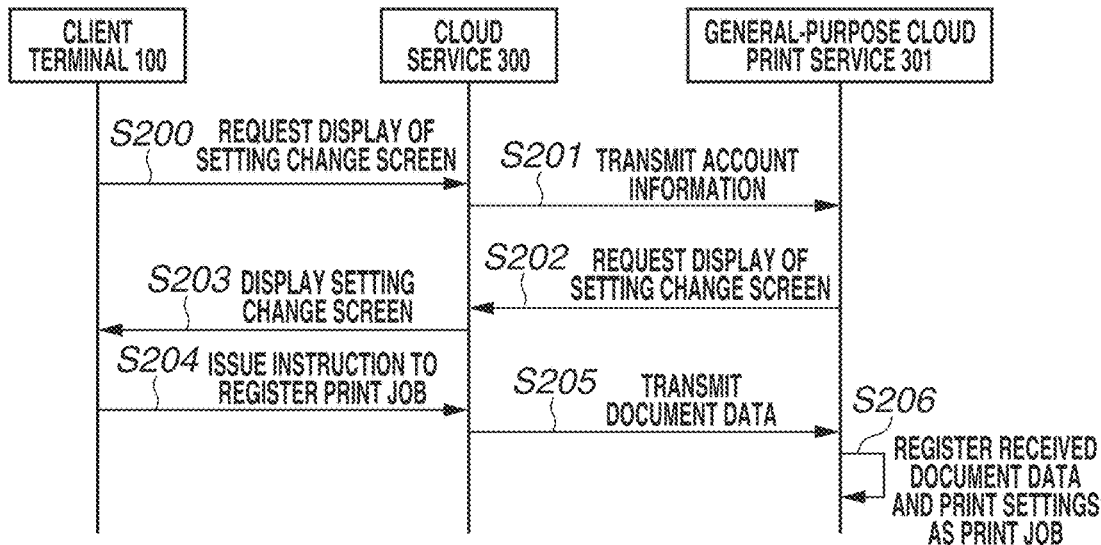
FIG. 6B is a sequence diagram illustrating print job registration on the general-purpose cloud print service.

FIG. 6B is a sequence diagram illustrating the method for registering the print job on the general-purpose cloud print service 301. In the present exemplary embodiment, a sequence for carrying out the printing from the above-described cloud service 300 using the general-purpose cloud print service 301 will be described with reference to FIG. 6B.

In step S200, the client terminal 100 issues a request to display the setting change screen to the cloud service 300. At this time, the user selects the use of the general-purpose cloud print service 301 capable of carrying out the basic function printing, and inputs the account information corresponding to the general-purpose cloud print service 301.

In step S201, the cloud service 300 logs in to the general-purpose cloud print service 301 based on the account information received from the client terminal 100.

In step S202, the general-purpose cloud print service 301 transmits a request to display the setting change screen provided by the setting change screen control unit 402 to the cloud service 300.

In step S203, the cloud service 300 causes the client terminal 100 to display the setting change screen thereon. The user can select the "execute printing" button after changing the print settings by operating the setting change screen.

In step S204, the client terminal 100 instructs the cloud service 300 to register the document data specified by the user as the print job.

In step S205, the cloud service 300 transmits the document data to print and the print settings, addressing them to the account of the user authenticated by the general-purpose cloud print service 301.

In step S206, the general-purpose cloud print service 301 registers the received document data and print settings as the print job.

Figure 6C:
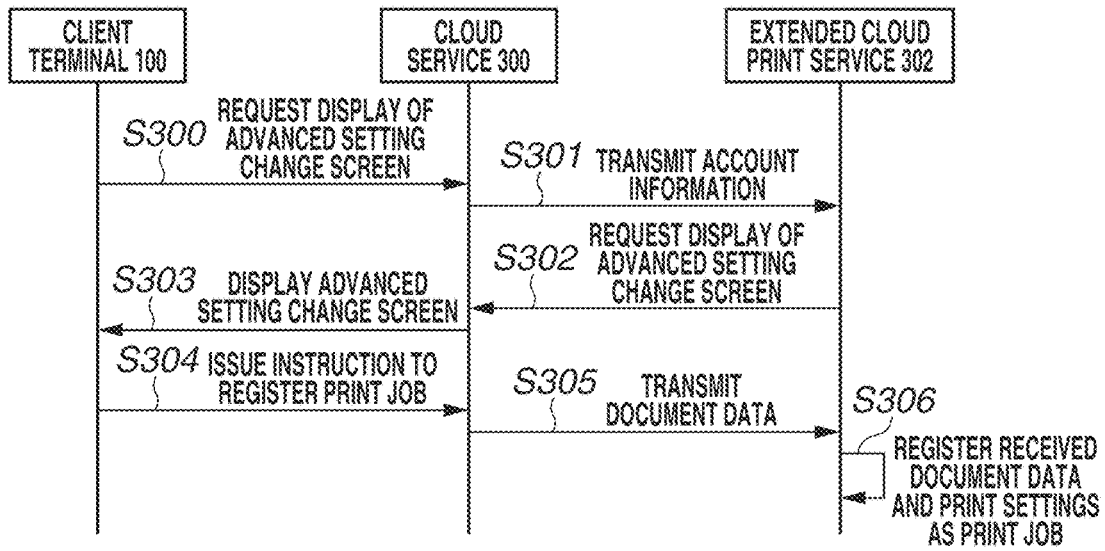
FIG. 6C is a sequence diagram illustrating print job registration on the extended cloud print service.

FIG. 6C is a sequence diagram illustrating the method for registering the print job on the extended cloud print service 302. In the present exemplary embodiment, a sequence for carrying out the printing from the above-described cloud service 300 using the extended cloud print service 302 will be described with reference to FIG. 6C.

In step S300, the client terminal 100 transmits a request to display the advanced setting change screen in reaction to selection of the extended cloud print service 302 as the destination to which the print job is submitted. At this time, the user inputs the account information corresponding to the extended cloud print service 302.

In step S301, the cloud service 300 transmits the account information input by the user to the extended cloud print service 302.

In step S302, the extended cloud print service 302 transmits a request to display the advanced setting change screen to the cloud service 300 after authenticating the account.

In step S303, the cloud service 300 causes the client terminal 100 to display the advanced setting change screen thereon. The advanced setting change screen displayed at this time is the advanced setting change screen provided by the advanced setting change screen control unit 502 of the extended cloud print service 302.

When the user selects "execute printing", in step S304, the client terminal 100 instructs the cloud service 300 to register the document data specified by the user as the print job.

In step S305, the cloud service 300 transmits the document data and the print settings to the extended cloud print service 302.

In step S306, the extended cloud print service 302 registers the received document data and print settings as the print job.

Next, access from the image forming apparatus 200 to each cloud service after the print job is registered on each cloud service will be described. In the present exemplary embodiment, a case is described where the printing is carried out as so-called pull printing in which the image forming apparatus 200 accesses each cloud service and acquires and outputs the print job. It is apparent that similar advantageous effects can be acquired in a case where the printing is carried out as push printing in which each cloud service causes the image forming apparatus 200 to carry out the printing.

First, an operation when the printing of the print job registered on the cloud service is carried out on the image forming apparatus 200 according to the conventional technique will be described with reference to FIGS. 7A, 7B, and 7C. The user holds the accounts corresponding to the cloud service 300, the general-purpose cloud print service 301, and the extended cloud print service 302.

The user selects a cloud service to which the print job corresponding to the data to print has been submitted on a screen for selecting a function to use (home screen).

A screen 701 is a login screen for logging in to the cloud service 300 and is displayed in a case where the user wants to print the job submitted to the cloud service 300. A screen 703 is a login screen for logging in to the general-purpose cloud print service 301 and is displayed in a case where the user wants to print the job submitted to the general-purpose cloud print service 301. A screen 705 is a login screen for logging in to the extended cloud print service 302 and is displayed in a case where the user wants to print the job submitted to the extended cloud print service 302.

The user inputs the account information on the login screen 701, 703, or 705 individually. The user accesses the cloud service 300, the general-purpose cloud print service 301, or the extended cloud print service 302 on the image forming apparatus 200. The cloud service that has received the login from the image forming apparatus 200 creates a list of print jobs registered therein. Then, the cloud service transmits the print job list to the image forming apparatus 200 and causes it to be displayed on the operation unit 208 of the image forming apparatus 200.

Information 702 lists the print jobs stored in the online storage of the cloud service 300. The print jobs submitted to the general-purpose cloud print service 301 and the extended cloud print service 302 are not displayed in this list.

Information 704 lists the print jobs stored in the general-purpose cloud print service 301. The print jobs submitted to the cloud service 300 and the extended cloud print service 302 are not displayed in this list.

Information 706 lists the print jobs stored in the extended cloud print service 302. The print jobs submitted to the cloud service 300 and the general-purpose cloud print service 301 are not displayed in this list. In particular, on the information 706, which is the print job list of the extended cloud print service 302 having the function of changing the advanced settings, a function of the advanced settings not supported by the other cloud services can be provided.

In the case of the above-described example, accessing each of the cloud services is necessary to display information about the print jobs stored in each of the cloud services. Thus, the user needs to input the account information. Further, the user needs to access the cloud service after recognizing where the print job is registered. To solve such an issue, the server system described herein creates an integrated print job list in which the respective print job lists of the cloud services are merged, and causes the image forming apparatus 200 to display it. Presenting such a display allows the user to select the print job to carry out the printing without being conscious of which service the print job has been submitted to.

Figure 10:
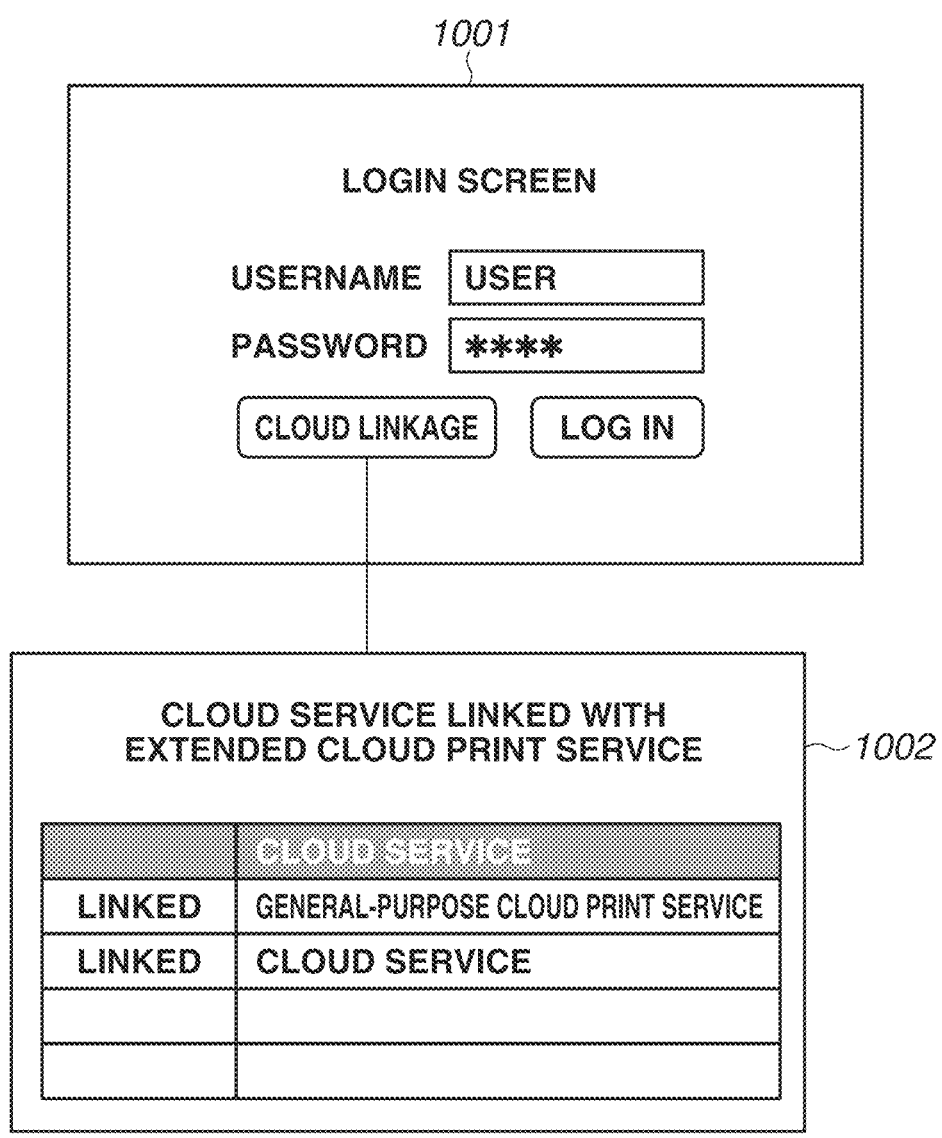
FIG. 10 illustrates an example of a login screen of the extended cloud print service displayed on the image forming apparatus.

FIGS. 10 and 11 illustrate screens that the extended cloud print service 302, which is the server system according to the present exemplary embodiment, provides to the image forming apparatus 200.

The user selects the extended cloud print service 302 on the screen for selecting a function to use (home screen). Then, a login screen indicated by 1001 in FIG. 10 is displayed. The user logs in to the extended cloud print service 302 by inputting the username and the password corresponding to the extended cloud print service 302 on the login screen 1001. A "cloud linkage" button is a button to display a screen for confirming or adding a cloud service with which the extended cloud print service 302 is linked. If the user selects the "cloud linkage" button, a screen indicated by 1002 is displayed. The already linked cloud service 300 and general-purpose cloud print service 301 are displayed on the screen 1002. Further, the user can register a cloud service in which the extended cloud print service 302 will be newly linked on the screen 1002. If the user selects a not-illustrated "register" button, a screen for registering the new cloud service is displayed.

FIG. 11 illustrates a list of print jobs displayed when the user selects a "log in" button on the login screen 1001 illustrated in FIG. 10. The information about the print jobs stored in the cloud service 300 and the information about the print jobs stored in the general-purpose cloud print service 301 are displayed in the list of print jobs in addition to the information about the print jobs stored in the extended cloud print service 302. An item "job name" is a filename of a file to print. A part of the print settings set to the print data is displayed in an item "print settings". The name of the cloud service specified by the user as the submission destination is displayed in an item "cloud service". The date and time of submission of the print job is indicated in an item "date and time". Only the date is displayed in FIG. 11, but the list may be configured to also display the submission time.

The print jobs can be displayed after being sorted by the job name, the type of the cloud service, or the date and time of submission of the print job in the list of print jobs illustrated in FIG. 11. For example, if the print jobs are sorted in the order of the date and time of submission of the print job from the latest to the earliest, the pieces of information about the print job are displayed in the order of "contract.pdf", "application.doc", "drawing.xls", and "report.pdf". In this manner, the pieces of information about the print job in the list can be sorted regardless of the type of the cloud service that is the destination to which the print job has been submitted on the screen illustrated in FIG. 11.

If the user selects a print job in a display 1101 illustrated in FIG. 11, the print job is selected as indicated by 1103. The user can also select a plurality of print jobs. If the user selects a "start printing" button 1104, the printing of the selected print job is carried out. If the user selects a "delete job" button while the information about the print job is selected, the extended cloud print service 302 deletes the selected information about the print job. Further, the extended cloud print service 302 transmits a request to delete the print job to the cloud service in which the selected print job is stored. If the user selects a "deselect" button 1105, the selected print job is deselected.

Next, a sequence for creating the integrated print job list by the extended cloud print service 302 will be described with reference to a sequence diagram illustrated in FIG. 8. In the present exemplary embodiment, the Open Authorization (OAuth) authorization system using an authorization server is used to implement authorization. The sequence illustrated in FIG. 8 is started in reaction to the user's logging in to the extended cloud print service 302 by operating the image forming apparatus 200.

In step S401, the image forming apparatus 200 receives the input of the account information from the user, and logs in to the extended cloud print service 302 using the account information.

In step S402, the extended cloud print service 302 transmits an acquisition request for an access token to an authorization server 310 of the general-purpose cloud print service 301 specified as the linkage destination.

In step S403, the authorization server 310 causes the image forming apparatus 200 to display the screen for inputting the username and the password corresponding to the general-purpose cloud print service 301, and carries out the user authentication based on the input information. Further, the authorization server 310 confirms authorization regarding whether the extended cloud print service 302 is permitted to access the general-purpose cloud print service 301 with the user via the operation unit 208 of the image forming apparatus 200.

In step S404, the image forming apparatus 200 transmits, to the authorization server 310, information indicating permission for the access using the information about the authorization input by the user.

In step S405, the authorization server 310 generates an access token required to access the general-purpose cloud print service 301.

In step S406, the authorization server 310 transmits the generated access token to the extended cloud print service 302.

In a case where the extended cloud print service 302 has already stored the access token for the general-purpose cloud print service 301, the processing described in steps S402 to S406 can be omitted.

In step S407, the extended cloud print service 302 issues an acquisition instruction for the print job information to the general-purpose cloud print service 301 using the acquired access token.

In step S408, the general-purpose cloud print service 301 verifies the received access token, and verifies whether the access is access authorized by the authorization server 310.

In step S409, the general-purpose cloud print service 301 confirms that there is no problem with the access authority as a result of the verification, and transmits the information about the print job to the extended cloud print service 302. The information about the print job here means bibliographic information such as the print settings of basic functions, the job name, and the date and time of submission of the print job. The information about the print job may be information contained in the print job or may be information stored in association with the print job in another server system.

Next, in steps S410 to S417, the extended cloud print service 302 performs processing similar to the processing performed with respect to the general-purpose cloud print service 301 in steps S402 to S409, targeting at the cloud service 300.

In step S410, the extended cloud print service 302 transmits an acquisition request for an access token to an authorization server 311 of the cloud service 300 specified as the linkage destination.

In step S411, the authorization server 311 causes the image forming apparatus 200 to display the screen for inputting the username and the password corresponding to the cloud service 300, and carries out the user authentication based on the input information. Further, the authorization server 311 confirms authorization regarding whether the extended cloud print service 302 is permitted to access the cloud service 300 with the user via the operation unit 208 of the image forming apparatus 200.

In step S412, the image forming apparatus 200 transmits, to the authorization server 311, information indicating permission for the access using the information about the authorization input by the user.

In step S413, the authorization server 311 generates an access token required to access the cloud service 300.

In step S414, the authorization server 311 transmits the generated access token to the extended cloud print service 302.

In a case where the extended cloud print service 302 has already stored the access token for the cloud service 300, the processing described in steps S410 to S414 can be omitted.

In step S415, the extended cloud print service 302 issues an acquisition instruction for the print job information to the cloud service 300 using the acquired access token.

In step S416, the cloud service 300 verifies the received access token, and verifies whether the access is access authorized by the authorization server 311.

In step S417, the cloud service 300 confirms that there is no problem with the access authority as a result of the verification, and transmits the information about the print job to the extended cloud print service 302. The information about the print job here means bibliographic information such as the print settings of basic functions, the job name, and the date.

In step S418, the extended cloud print service 302 creates the integrated print job list by merging the pieces of print job information acquired in steps S409 and S417. In step S418, the extended cloud print service 302 generates data in the Hyper Text Markup Language (HTML) format that constructs the screen illustrated in FIG. 11 on which the list of print jobs is displayed. The processing performed by the extended cloud print service 302 in step S418 will be described in detail below with reference to FIG. 9.

Then, in step S419, the extended cloud print service 302 instructs the image forming apparatus 200 to display the created integrated print job list. Upon receiving the integrated print job list, the image forming apparatus 200 displays the received integrated print job list on the operation unit 208 using, for example, a web browser function.

Now, the method for creating the integrated print job list will be described in detail with reference to a flowchart illustrated in FIG. 9.

FIG. 9 is a flowchart in which the extended cloud print service 302 creates the integrated print job list by merging the information acquired from each of the cloud services. The CPU(s) of one or a plurality of information processing apparatuses forming the extended cloud print service 302 execute(s) the program stored in the ROM or the auxiliary storage device to implement the processing illustrated in FIG. 9.

First, in step S900, the extended cloud print service 302 starts the processing thereof after acquiring the job information from each of the cloud services.

In step S901, the print job management unit 503 of the extended cloud print service 302 determines whether there is the integrated print job list. One integrated print job list is prepared for one account on the extended cloud print service 302. Thus, if there is the previously created integrated print job list (YES in step S901), the print job management unit 503 advances the processing to step S903. If the integrated print job list has not been created (NO in step S901), the print job management unit 503 advances the processing to step S902.

In step S902, the extended cloud print service 302 creates a frame of the integrated print job list having the sort function. The information about each print job is not reflected yet at this point. The sort function refers to a mechanism capable of sorting the print jobs according to the content of the print job information, and refers to, for example, sorting the print jobs by the job name, sorting the print jobs by the date, and sorting the print jobs by the cloud service name. Sorting the print jobs by the job name means sorting the pieces of information about the print jobs in the order of the Japanese syllabary or in the alphabetical order. Sorting the print jobs by the date means sorting the pieces of information about the print jobs in the order of the date of submission of the print job from the earliest to the latest or from the latest to the earliest. Sorting the print jobs by the cloud service name means sorting the pieces of information about the print jobs by the type of the cloud service.

In step S903, the print job management unit 503 of the extended cloud print service 302 reflects the print job information stored in the extended cloud print service 302 into the integrated print job list. If the integrated print job list is determined as having been already prepared in step S901 (YES in step S901), the print job management unit 503 of the extended cloud print service 302 updates the information about the print jobs stored in the extended cloud print service 302 that is contained in the integrated print job list.

In step S904, the print job management unit 503 of the extended cloud print service 302 reflects the print job information acquired from the general-purpose cloud print service 301 into the integrated print job list. If the integrated print job list is determined as having been already prepared in step S901 (YES in step S901), the print job management unit 503 of the extended cloud print service 302 updates the information about the jobs stored in the general-purpose cloud print service 301 that is contained in the integrated print job list with the information acquired in step S409.

In step S905, the print job management unit 503 of the extended cloud print service 302 reflects the print job information acquired from the cloud service 300 into the integrated print job list. If the integrated print job list is determined as having been already prepared in step S901 (YES in step S901), the print job management unit 503 of the extended cloud print service 302 updates the information about the jobs stored in the cloud service 300 that is contained in the integrated print job list with the information acquired in step S417.

Then, in step S906, the processing for creating the integrated print job list is ended. Through the above-described flow, the integrated print job list is created with the pieces of print job information of the linked cloud services reflected therein.

Performing the above-described processing allows the login screen on the image forming apparatus 200 to be integrated (login screen 1001) as illustrated in FIG. 10. Thus, the user can confirm the print jobs of each of the linked cloud services (screen 1002) only by logging in using the account information corresponding to the extended cloud print service 302.

Further, if necessary, the user can expand the linked cloud services by inputting account information corresponding to an intended cloud service on the screen. The present configuration also allows the extended cloud print service 302 to prompt the user to link to a highly convenient cloud service that is an unlinked cloud service and different especially in function from the extended cloud print service 302.

In the present exemplary embodiment, the pieces of job information are merged on the extended cloud print service 302, but there is no problem if the pieces of job information are merged on the image forming apparatus 200 side. Further, even in a case where the integrated print job list is created, the image forming apparatus 200 can still keep using the screen for login to each of the cloud services as in FIGS. 7A and 7B.

FIG. 11 illustrates the example of the display of the integrated print job list created by the extended cloud print service 302 that is displayed on the image forming apparatus 200 (display 1101) as described above. The print jobs of each of the cloud services can be viewed in a list. Further, the display has the function of allowing the print jobs to be sorted by the item of the job name, the cloud service that indicates where the registered print job is located, the date, or the like to improve visibility as described above. When being sorted by the item of the cloud service, the print jobs are displayed while being grouped by the cloud service. When being sorted by the date, the print jobs are displayed in the order of the date and time of submission from the latest to the earliest or from the earliest to the latest. In FIG. 11, the print jobs are displayed in the order of the date and time of submission of the print job from the earliest to the latest. As illustrated in FIG. 11, the print jobs are displayed in the list form while being sorted independently of the cloud service specified as the submission destination by the user in the present exemplary embodiment. Presenting such a display allows the user to select the print job to print without being conscious of which service the job has been submitted to.

Next, the printing of the print job submitted to the general-purpose cloud print service 301 from the integrated print job list displayed by the extended cloud print service 302 will be described with reference to FIG. 14. FIG. 14 is a sequence diagram illustrating processing when the user selects the print job registered in the general-purpose cloud print service 301 from the integrated print job list and selects the "start printing" button 1104.

In step S601, the image forming apparatus 200 transmits a request to start the printing of the print job selected by the user to the extended cloud print service 302.

In step S602, the extended cloud print service 302 determines which service stores the print job that the extended cloud print service 302 is instructed to print. In the present example, suppose that the selected print job is a print job stored in the general-purpose cloud print service 301.

In step S603, the extended cloud print service 302 transmits an acquisition request for the print job that the extended cloud print service 302 is instructed to print using the access token for accessing the general-purpose cloud print service 301.

In step S604, the general-purpose cloud print service 301 verifies the access token received from the extended cloud print service 302. If the request is issued from the extended cloud print service 302 permitted to access the general-purpose cloud print service 301, the general-purpose cloud print service 301 transmits the requested print job to the extended cloud print service 302. The processing described in steps S403 to S406 illustrated in FIG. 8 may be performed if the verification of the access token is not successful.

In step S605, the extended cloud print service 302 transmits a notification indicating that the acquisition of the print job is completed to the general-purpose cloud print service 301.

In step S606, the general-purpose cloud print service 301 deletes the print job, the notification about which has been transmitted from the extended cloud print service 302, from the general-purpose cloud print service 301.

In step S607, the extended cloud print service 302 transmits the print job to the image forming apparatus 200.

In step S608, the image forming apparatus 200 analyzes the print job received from the extended cloud print service 302 and carries out the printing.

In step S609, upon completing the printing, the image forming apparatus 200 transmits a print completion notification to the extended cloud print service 302.

In step S610, the extended cloud print service 302 deletes the print job, the print completion notification about which has been transmitted from the image forming apparatus 200, and the information about the print job stored in the table for managing the bibliographic information.

FIG. 14 has been described referring to the example when the image forming apparatus 200 carries out the print job submitted to the general-purpose cloud print service 301. In a case where the image forming apparatus 200 carries out the print job submitted to the cloud service 300, the general-purpose cloud print service 301 illustrated in FIG. 14 is replaced with the cloud service 300. Further, in a case where the image forming apparatus 200 carries out the print job submitted to the extended cloud print service 302, the processing in steps S603 to S606 is omitted, and the processing in step S607 and the subsequent steps is performed after step S602.

The sequence illustrated in FIG. 14 allows the user to carry out the print job submitted to the general-purpose cloud print service 301 or the cloud service 300 from the list of print jobs displayed by the extended cloud print service 302.

The user can change the print settings by selecting the print job in the integrated print job list illustrated in FIG. 11 and selecting an "advanced settings" button 1102.

However, the print jobs registered in the general-purpose cloud print service 301 are limited to the basic functions, and thus a part of the setting items settable on the extended cloud print service 302 cannot be reflected therein. Thus, in a case where changing of the settings of a print job registered in another cloud service is instructed, the extended cloud print service 302 acquires the print job from the other cloud service. Then, the extended cloud print service 302 performs processing for reregistering the print job registered in the other cloud service with the extended cloud print service 302, thereby allowing the user to configure the advanced settings. The present processing will be described with reference to a sequence diagram regarding processing between the individual cloud services illustrated in FIG. 12.

FIG. 12 is a sequence diagram for reregistering the print job in the extended cloud print service 302 from the general-purpose cloud print service 301 to allow the user to change the advanced print settings.

In step S501, the image forming apparatus 200 receives an input to change the print settings from the user, and instructs the extended cloud print service 302 to permit the change in the print settings of the selected print job. When the user selects the "advanced settings" button 1102, the processing described in step S501 is performed.

In the present example, suppose that the user issues an instruction to change the settings of the print job registered in the general-purpose cloud print service 301.

In step S502, the extended cloud print service 302 transmits an acquisition request for the access token to the authorization server 310 of the general-purpose cloud print service 301.

In step S503, the authorization server 310 transmits a request for user confirmation to the image forming apparatus 200. In reaction to the request, the image forming apparatus 200 displays the ID and password screen for logging in to the general-purpose cloud print service 301. Then, the authorization server 310 carries out the authentication for logging in to the general-purpose cloud print service 301 based on the input ID and password. Then, the authorization server 310 causes the image forming apparatus 200 to display a screen for inquiring of the user whether the extended cloud print service 302 is permitted to access the general-purpose cloud print service 301.

When the user instructs the image forming apparatus 200 to permit the access, in step S504, the image forming apparatus 200 transmits an access permission instruction to the authorization server 310.

In step S505, the authorization server 310 generates an access token for allowing the extended cloud print service 302 to access the general-purpose cloud print service 301. In step S506, the authorization server 310 transmits the generated access token to the extended cloud print service 302.

The processing in steps S502 to S506 between the extended cloud print service 302, the authorization server 310, and the image forming apparatus 200 may be omitted if the extended cloud print service 302 has already held the access token for accessing the general-purpose cloud print service 301.

In step S507, the extended cloud print service 302 issues an acquisition instruction for the print job targeted for the change in the print settings specified on the image forming apparatus 200 to the general-purpose cloud print service 301 using the access token.

In step S508, the general-purpose cloud print service 301 verifies the received access token, and verifies whether the access is access authorized by the authorization server 310.

In step S509, the general-purpose cloud print service 301 transmits the print job targeted for the change in the print settings specified on the image forming apparatus 200.

In step S510, the extended cloud print service 302 registers the acquired print job in the extended cloud print service 302.

Upon completing the registration of the received print job, in step S511, the extended cloud print service 302 notifies the general-purpose cloud print service 301 of a notification indicating that the acquisition of the print job is completed.

In step S512, the general-purpose cloud print service 301 receives the notification indicating that the acquisition of the print job is completed from the extended cloud print service 302, and deletes the print job.

In step S513, the extended cloud print service 302 recreates the integrated print job list including the newly acquired print job. At this time, the extended cloud print service 302 registers the print job of which the extended cloud print service 302 is instructed to change the print settings with the integrated print job list as the print job registered in the extended cloud print service 302.

In step S514, the extended cloud print service 302 displays the not-illustrated print setting change screen on the image forming apparatus 200. The print setting change screen is a screen on which the user can set print settings that cannot be set using the print functions of the general-purpose cloud print service 301 and the cloud service 300. The print settings that cannot be set on the general-purpose cloud print service 301 and the cloud service 300 include the finishing setting corresponding to the finisher, the profile setting to which the installed color profile is applied, the setting of the font substitution based on the installed font, and the like.

FIG. 13 illustrates an example of the integrated print job list recreated in step S513 illustrated in FIG. 12.

The print job with the general-purpose cloud print service displayed in the item of the cloud service in FIG. 11 is listed with the extended cloud print service displayed in the item in a recreated integrated print job list 1301. Performing such processing causes the print job to be stored in the extended cloud print service 302, thereby allowing the user to change the print settings.

FIGS. 12 and 13 have been described using the example of changing the print settings of the print job registered in the general-purpose cloud print service 301. A similar method may be performed in a case where the print settings of the print job registered in the cloud service 300 are to be changed. In such a case, the authorization server 310 illustrated in FIG. 12 is replaced with the authorization server 311 corresponding to the cloud service 300, and the general-purpose cloud print service 301 is replaced with the cloud service 300.

Further, in a case where the settings of the print job stored in the extended cloud print service 302 are to be changed, the processing illustrated in FIG. 12 is unnecessary.

With the server system described in the present exemplary embodiment, the user can confirm the print data that can be processed on the image forming apparatus 200 without being conscious of the cloud print service to which the print job has been submitted.

Further, the server system can improve the convenience of the user by being linked with the plurality of cloud services and, further, can provide an advanced print setting method suitable for the image forming apparatus 200 to the user in the cloud printing using the cloud print service.

According to the server system described above in the exemplary embodiments, the user can confirm the print data that can be processed by the image forming apparatus without being conscious of the cloud print service to which the print job has been submitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-212298, filed Nov. 25, 2019, which is hereby incorporated by reference herein in its entirety.

What is claimed is:

1. A first server system comprising:
 a controller including a processor, the controller configured to:
  store a plurality of first job identifiers corresponding to first user identification information and first image files respectively corresponding to the first job identifiers;
  receive, from an image forming apparatus, the first user identification information;
  acquire an access token based on second user identification information different from the first user identification information in a situation that a user has logged into the first server system based on the first user identification information;
  acquire, from a second server system that stores a plurality of second job identifiers and second image files respectively corresponding to the second job identifiers, the plurality of second job identifiers by using the acquired access token; and
  cause the image forming apparatus to display the stored plurality of first job identifiers corresponding to the first user identification information and the acquired plurality of second job identifiers, which are arranged in an order set regardless of which server system each of the first and second image files is stored in.

2. The first server system according to claim 1, wherein the first user identification information is user identification information for a user to login to the first server system and the second identification information is user identification information for the user to login to the second server system.

3. The first server system according to claim 1, wherein the controller is further configured to:

receive, from the image forming apparatus, an instruction for printing based on one of the first image files; and
transmit, in response to the received instruction, the one of the first image files to the image forming apparatus.

4. The first server system according to claim 1, wherein the controller is further configured to:
receive, from the image forming apparatus, an instruction for printing based on one of the second image files;
acquire, from the second server system, the one of the second image files by using the access token; and
transmit the acquired one of the second image files to the image forming apparatus.

5. The first server system according to claim 1, wherein the order is an order based on date on which each of the first image files was stored in the first server system and date on which each of the second image files was stored in the second server system.

6. The first server system according to claim 1, wherein the controller is further configured to:
acquire, in response to reception of the first user identification information, the second identifiers from the second server system without receiving the second user identification information.

7. The first server system according to claim 1, wherein the controller is further configured to:
acquire the access token in a case that the first server system does not store the access token.

8. The first server system according to claim 1, wherein the controller is further configured to:
cause the image forming apparatus to display the first identifiers with first information indicating the first server system and the second identifiers with second information indicating the second server system.

9. The first server system according to claim 1, wherein the controller is further configured to:
receive the first image files from an information processing apparatus, wherein each of the first image files is a file that the information processing apparatus transmits to the first server system based on a user instruction in a situation that the first server system is designated as a destination of the image file and each of the second image files is a file that an information processing apparatus transmits to the second server system based on a user instruction in a situation that the second server system is designated as a destination of the image file.

10. The first server system according to claim 1, wherein the controller is further configured to:
acquire the plurality of second job identifiers without acquiring the second image files.

11. A method for controlling a first server system comprising a controller including a processor, the method comprising:
storing a plurality of first job identifiers corresponding to first user identification information and first image files respectively corresponding to the first job identifiers;
receiving, from an image forming apparatus, the first user identification information;
acquiring an access token based on second user identification information different from the first user identification information in a situation that a user has logged into the first server system based on the first user identification information;
acquiring, from a second server system that stores a plurality of second job identifiers and second image files respectively corresponding to the second job identifiers, the plurality of second job identifiers by using the acquired access token; and
displaying, by the image forming apparatus, the stored plurality of first job identifiers corresponding to the first user identification information and the acquired plurality of second job identifiers, which are arranged in an order set regardless of which server system each of the first and second image files is stored in.

12. An image forming apparatus comprising:
a controller including a processor, the controller configured to:
receive a user instruction for inputting first user identification information;
transmit the received first user identification information to a first server system that stores a plurality of first job identifiers and first image files respectively corresponding to the first job identifiers;
receive, from the first server system, the plurality of first job identifiers and a plurality of second job identifiers acquired from a second server system that stores the plurality of second job identifiers and second image files respectively corresponding to the second job identifiers, wherein the plurality of second job identifiers are acquired by using an access token that has been acquired based on second user identification information different from the first user identification information in a situation that a user has logged into the first server system based on the first user identification information; and
display the plurality of received first job identifiers and the plurality of second job identifiers arranged in an order set regardless of which server system each of the first and the second image files is stored in.

13. The image forming apparatus according to claim 12, wherein the received plurality of second job identifiers are job identifiers which the first server system acquires from the second server system by using the access token.

14. The image forming apparatus according to claim 12, wherein the first user identification information is user identification information for a user to login to the first server system and the second identification information is user identification for the user to login to the second server system.

15. The image forming apparatus according to claim 12, wherein each of the first image files is a file that an information apparatus transmits to the first server system based on a user instruction received in a situation that the first server system is designated as a destination of the image file and each of the second image files is a file that an information processing apparatus transmits to the second server system based on a user instruction received in a situation that the second server system is designated as a destination of the image file.

16. A first server system comprising:
a storage configured to store a plurality of first job identifiers and first image files respectively corresponding to the first job identifier;
a controller configured to:
acquire an access token based on user identification information of a second server system in a situation that a user has logged into the first server system;
acquire, from the second server system that stores a plurality of second job identifiers and second image files respectively corresponding to the second job identifier, the plurality of second job identifiers by using the acquired access token; and
cause an image forming apparatus to display the stored plurality of first job identifiers and the acquired plurality of second job identifiers, which are arranged in an order set regardless of which server system each of the first and second image files is stored in.

17. The first server system according to claim 16, wherein the storage stores the plurality of first job identifiers corresponding to user identification information of the first server system.

18. The first server system according to claim 17, wherein the user identification information of the first server system is received from an image forming apparatus and the first server system has been logged into by the user based on the received user identification information of the first server system.

19. The first server system according to claim 17, wherein the user identification information of the second server system is different from the user identification information of the first server system.

20. The first server system according to claim 17, wherein the first job identifier displayed by the image forming apparatus is corresponding to the user identification information of the first server system.

21. The first server system according to claim 16, wherein the image forming apparatus displays the stored plurality of first job identifiers and the acquired plurality of second job identifiers, in a situation that the user has logged into the first server system.

22. A control method for controlling a first server system storing a plurality of first job identifiers and first image files respectively corresponding to the first job identifier, the method comprising:
   acquiring an access token based on user identification information of a second server system in a situation that a user has logged into the first server system;
   acquiring, from the second server system that stores a plurality of second job identifiers and second image files respectively corresponding to the second job identifier, the plurality of second job identifiers by using the acquired access token; and
   causing an image forming apparatus to display the stored plurality of first job identifiers and the acquired plurality of second job identifiers, which are arranged in an order set regardless of which server system each of the first and second image files is stored in.

23. The control method according to claim 22, wherein the first server system stores the plurality of first job identifiers corresponding to user identification information of the first server system.

24. The control method according to claim 23, wherein the user identification information of the first server system is received from an image forming apparatus and the first server system has been logged into by the user based on the received user identification information of the first server system.

25. The control method according to claim 23, wherein the user identification information of the second server system is different from the user identification information of the first server system.

26. The control method according to claim 25, wherein the first job identifier displayed by the image forming apparatus is corresponding to the user identification information of the first server system.

27. The control method according to claim 22, wherein the image forming apparatus displays the stored plurality of first job identifiers and the acquired plurality of second job identifiers, in a situation that the user has logged into the first server system.

* * * * *